(12) United States Patent
Gendron et al.

(10) Patent No.: US 7,567,714 B2
(45) Date of Patent: Jul. 28, 2009

(54) SYSTEM, METHOD AND APPARATUS FOR CLUSTERING FEATURES

(75) Inventors: Marlin L. Gendron, Pass Christian, MS (US); Geary J. Layne, Slidell, LA (US); Maura C. Lohrenz, Pearl River, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 801 days.

(21) Appl. No.: 10/997,091

(22) Filed: Nov. 23, 2004

(65) Prior Publication Data

US 2006/0009955 A1  Jan. 12, 2006

Related U.S. Application Data

(60) Provisional application No. 60/585,790, filed on Jul. 7, 2004, provisional application No. 60/585,789, filed on Jul. 7, 2004.

(51) Int. Cl.
*G06K 9/62* (2006.01)
*G06K 9/48* (2006.01)
*G06K 9/40* (2006.01)
*G06K 9/46* (2006.01)
*G06K 9/66* (2006.01)

(52) U.S. Cl. ............... 382/225; 382/241; 382/242; 382/266; 382/190

(58) Field of Classification Search ............... None
See application file for complete search history.

(56) References Cited

U.S. PATENT DOCUMENTS 4,484,192 A  11/1984  Seitz et al.

(Continued)

FOREIGN PATENT DOCUMENTS

EP  0841638 A2  5/1998

OTHER PUBLICATIONS

Lohrenz, M.C.; Edwards, S.S.; Myrick, S.A.; Gendron, M.L.; Trenchard, M.E., "Demonstration of a moving-map system for improved precise lane navigation of amphibious vehicles and landing craft", Proceedings, Oceans 2003, vol. 3, pp. 1247-1254.

(Continued)

*Primary Examiner*—Vikkram Bali
*Assistant Examiner*—Michelle Entezari
(74) *Attorney, Agent, or Firm*—John J Karasek; Sally A Ferrett

(57) ABSTRACT

A method, system, computer-readable medium, and apparatus for identifying a boundary of a cluster in a bitmap, the bitmap having at least one initially set bit, for applying an expansion shape to each of the initially set bits in the bitmap and identifying vertex bits on the boundary of the cluster formed by at least one expansion shape. A method system, computer-readable medium, and apparatus for identifying vertex bits in a bitmap having at least two adjacent bits with non-zero values forming a boundary of a cluster, the interior bits of the cluster having a zero value, including starting from a current non-zero bit, evaluating at least a first adjacent bit and a second adjacent bit, setting an adjacent non-zero bit as the new current bit, and identifying the current bit as a vertex bit if a direction of motion from the current bit to the new current bit changes.

43 Claims, 16 Drawing Sheets

U.S. PATENT DOCUMENTS

Figures 1A, 1B:
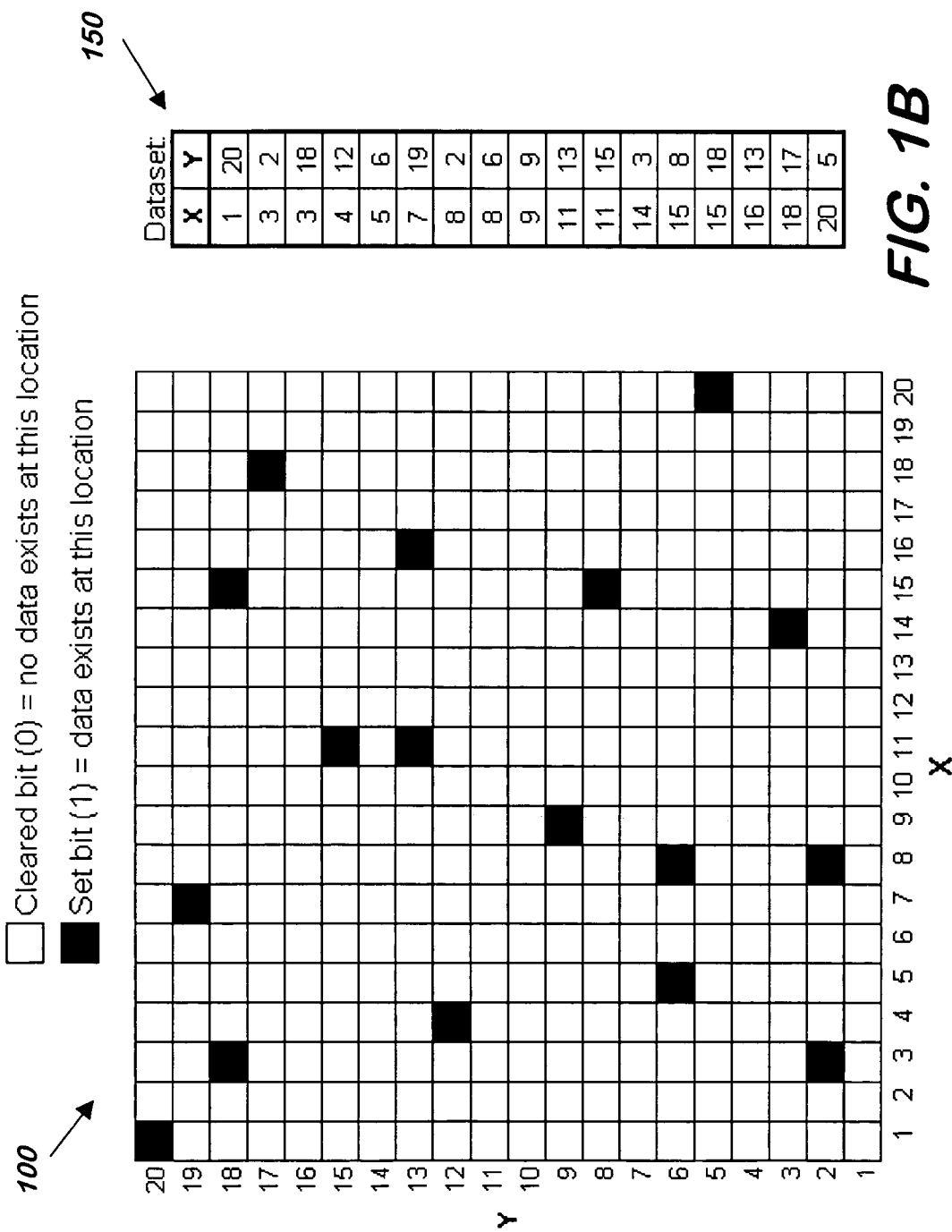

| | | | |
|---|---|---|---|
| 4,625,288 A | | 11/1986 | Weiner et al. |
| 5,020,119 A | * | 5/1991 | Tai et al. .................... 382/269 |
| 5,201,011 A | * | 4/1993 | Bloomberg et al. ......... 382/175 |
| 5,363,107 A | * | 11/1994 | Gertz et al. ............... 342/26 B |
| 5,463,723 A | | 10/1995 | Saha |
| 5,631,982 A | * | 5/1997 | Inselberg et al. ............ 382/281 |
| 5,694,481 A | * | 12/1997 | Lam et al. .................. 382/145 |
| 5,696,844 A | * | 12/1997 | Takagi ........................ 382/199 |
| 5,884,219 A | | 3/1999 | Curtwright et al. |
| 6,038,335 A | * | 3/2000 | Yokoyama et al. .......... 382/141 |
| 6,078,695 A | | 6/2000 | Kadono |
| 6,097,853 A | * | 8/2000 | Gu et al. ..................... 382/282 |
| 6,218,965 B1 | * | 4/2001 | Gendron et al. ............. 701/208 |
| 6,229,918 B1 | | 5/2001 | Toyama |
| 6,249,607 B1 | | 6/2001 | Murakawa |
| 6,535,637 B1 | * | 3/2003 | Wootton et al. ............. 382/190 |
| 6,728,405 B1 | | 4/2004 | Kazato et al. |
| 6,775,410 B1 | | 8/2004 | Loce et al. |
| 7,065,242 B2 | * | 6/2006 | Petrov et al. ................ 382/154 |
| 2002/0029235 A1 | * | 3/2002 | Lock et al. .................. 708/814 |
| 2003/0025697 A1 | | 2/2003 | Gupta |
| 2003/0132947 A1 | * | 7/2003 | Luo ............................ 345/619 |
| 2003/0193497 A1 | * | 10/2003 | Yhann ........................ 345/419 |
| 2003/0202709 A1 | * | 10/2003 | Simard et al. ............... 382/243 |
| 2004/0151384 A1 | * | 8/2004 | Yang et al. .................. 382/225 |
| 2004/0190092 A1 | * | 9/2004 | Silverbrook et al. ........ 358/539 |
| 2004/0233197 A1 | | 11/2004 | Liu et al. |
| 2005/0151733 A1 | * | 7/2005 | Sander et al. ............... 345/423 |
| 2006/0007232 A1 | | 1/2006 | Layne et al. |

OTHER PUBLICATIONS

Potlapalli, H.; Jaisimha, M.Y.; Barad, H.; Martinez, A.B.; Lohrenz, M.C.; Ryan, J.; Pollard, J., "Classification techniques for digital map compression", Proceedings of the Twenty-First Southeastern Symposium on System Theory, 1989, pp. 263-272.

Jaisimha, M.Y.; Potlapalli, H.; Barad, H.; Martinez, A.B.; Lohrenz, M.C.; Ryan, J.; Pollard, J.; "Data compression techniques for maps", Proc. IEEE Southeastcon '89. 'Energy and Information Technologies in the Southeast'., 1989, vol. 2, pp. 878-883.

Lohrenz, M.C.; Wischow, P.B.; Rosche, H., III; Trenchard, M.E.; Riedlinger, L.M.; "The compressed aeronautical chart database: support of naval aircraft's digital moving map systems", Position Location and Navigation Symposium, 1990. IEEE PLANS '90., 1990, pp. 67-73.

Ho, T.K. and Nagy G., OCR with no shape training, Proceedings of the 15th International Conference on Pattern Recognition, pp. 27-30, Barcelona, Spain, Sep. 3-7, 2000.

Hobby, J. and Ho, T.K., "Enhancing degraded document images via bitmap clustering and averaging", Proceedings of the 4th International Conference on Document Analysis and Recognition, pp. 394-400, Ulm, Germany, (1997).

Jain, A.K., Murty, M.N., and Flynn, P.J., "Data clustering: a review", ACM Computing Surveys, vol. 31, Issue 3, pp. 264-323 (1999).

Layne, G., Gendron, M., and Lohrenz, M., "POS Polyline Smoothing: Reduction of Polyline Vertices", Proceedings of the Tenth International Conference on Industry, Engineering and Management Systems, Cocoa Beach, FL, presented in Mar. 2004.

Layne, G., Gendron, M., and Lohrenz, M., "POS Polyline Smoothing: Reduction of Polyline Vertices", Tenth International Conference on Industry, Engineering and Management Systems, Cocoa Beach, FL, viewgraphs, pp. 1-13, presented in Mar. 2004.

Voorhees, E.M., "The cluster hypothesis revisted", Proceedings of the 8th Annual International ACM SIGIR Conference on Research and Development in Information Retrieval, pp. 188-196 (1985).

Yoon, J.P., Raghavan, V., and Chakilam, V., "BitCube: a three-dimensional bitmap indexing for XML documents", Journal of Intelligent Information Systems, vol. 17, pp. 241-252 (2001).

M.L. Gendron, "Algorithms and Data Structures for Automated Change Detection and Classification of Sidescan Sonar Imagery", dissertation submitted to U. of New Orleans in Dec. 2004, cataloged Jan. 28, 2005, pp. 27-67.

* cited by examiner

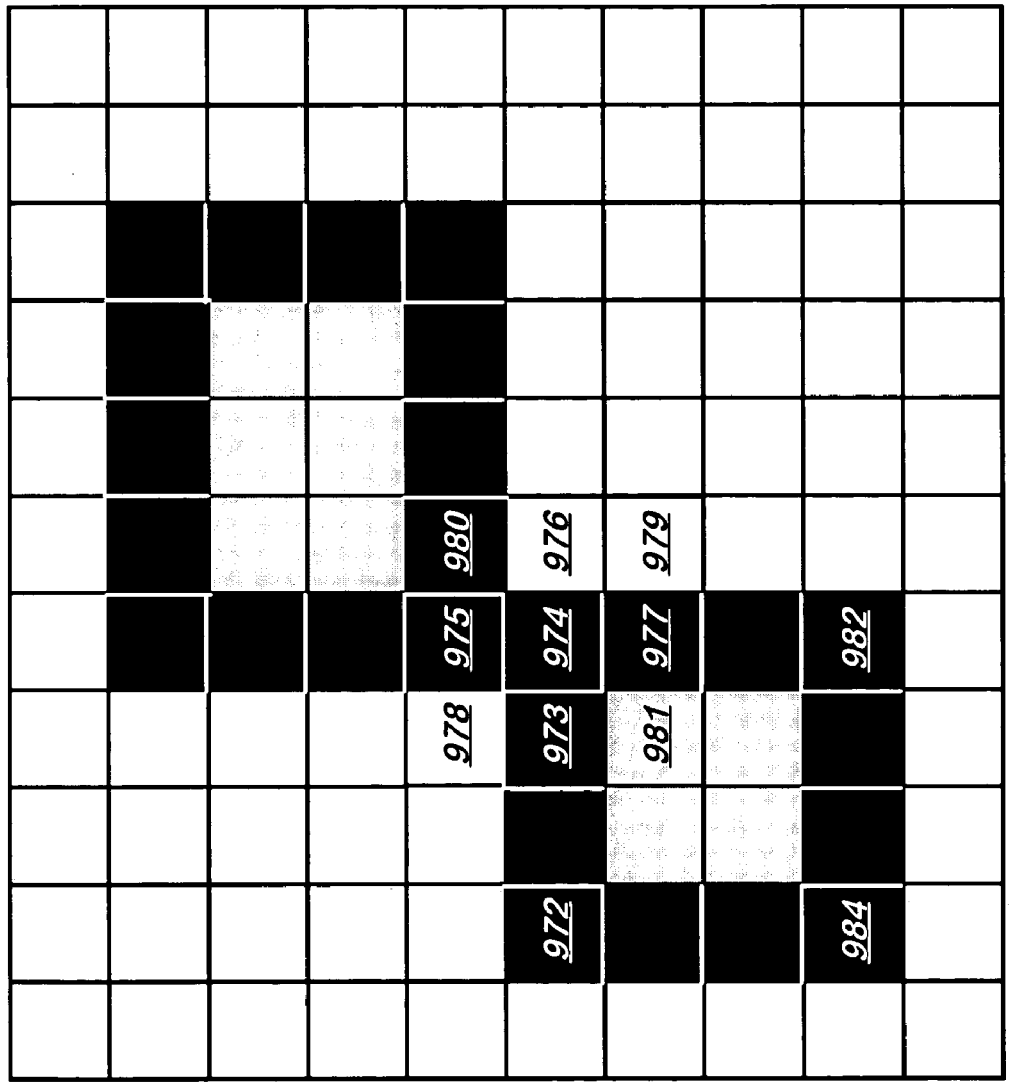

SYSTEM, METHOD AND APPARATUS FOR CLUSTERING FEATURES

CROSS REFERENCE TO RELATED APPLICATIONS

This application claims the benefit of provisional application 60/585,790 and provisional application 60/585,789, each of which were filed in the U.S. on Jul. 7, 2004, the disclosures of each of which are incorporated by reference herein in their entireties.

FIELD OF THE INVENTION

This invention relates in general to a system and method for clustering objects in vector space, and in particular to a system and method for clustering objects in a geospatial bitmap.

BACKGROUND OF THE INVENTION

Clustering can be defined as the unsupervised classification of patterns (observations, data items, or feature vectors) into groups (clusters). Clustering algorithms have been developed in support of various disciplines, including biology (e.g., clustering bacterial growth), physics (e.g., clustering high-energy particles), demographics (e.g., clustering populations), medicine (e.g., identifying clusters of tumors), and information technology (e.g., data mining/compression/sorting, image classification/segmentation/retrieval).

Aspects of clustering are described in:
(a) Barnard, J. M. Agglomerative hierarchical clustering package from Barnard Chemical Information, Ltd. Presented at *Daylight EUROMUG Meeting*, Basel, Switzerland, Dec. 17 (1996);
(b) Can, F. and E. A. Ozkarahan (December 1990) Concepts and effectiveness of the cover-coefficient-based clustering methodology for text databases. *ACM TODS* 15(4): 483-512;
(c) Cormen, T. H., C. E. Leiserson, and R. L. Rivest. *Introduction to Algorithms, Second Edition*. MIT Press and McGraw-Hill, Cambridge, Mass. (2001);
(d) Day, W. H. E. and H. Edelsbrunner (1984). Efficient algorithms for agglomerative hierarchical clustering methods. *Journal of Classification*, 1(1), pp. 7-24;
(e) Downs, G. (2001) Clustering in chemistry. Presented at MathFIT workshop, Belfast, April 27;
(f) Downs, G. M. and J. M. Barnard (2003). Clustering methods and their uses in computational chemistry. *Reviews in Computational Chemistry*, Volume 18, Chapter 1, pp. 5-40. John Wiley and Sons, Inc., New York, N.Y.;
(g) U.S. Pat. No. 6,218,965 B1 to Gendron, M. L., P. B. Wischow, M. E. Trenchard, M. C. Lohrenz, L. M. Riedlinger and M. J. Mehaffey, entitled "Moving Map Composer", incorporated by reference in its entirety;
(h) Halkidi, M., Y. Batistakis and M. Vazirgiannis (2002). Cluster validity methods: Part II. SIGMOD Record;
(i) Hartigan, J. A. (1975). *Clustering Algorithms*. John Wiley and Sons, Inc., New York, N.Y.;
(j) Hartigan, J. A. and M. A. Wong (1979). A K-means clustering algorithm. *Applied Statistics* 28, 100-108;
(j) Ho, T. K. and G. Nagy (2000). OCR with no shape training. In *Proceedings of the 15th International Conference on Pattern Recognition*, pp. 27-30. Barcelona, Spain, September 3-8;
(k) Hobby, J. and T. K. Ho (1997). Enhancing degraded document images via bitmap clustering and averaging. In *Proceedings of the 4th International Conference on Document Analysis and Recognition*, pp. 394-400. Ulm, Germany, August 18-20;
(l) Höppner, F., F. Klawonn, R. Kruse and T. Runkler (1999). *Fuzzy Cluster Analysis*. John Wiley and Sons, Inc., Chicester, England;
(m) Jain, A. K., M. N. Murty, and P J. Flynn (1999). Data clustering: a review. *ACM Computing Surveys* 31(3). 264-323;
(n) JMPIN V.4.0.4 statistical analysis software package (2003). SAS Institute Inc., Cary, N.C.;
(o) Layne, G., M. Gendron and M. Lohrenz (2004). POS Polyline Smoothing: Reduction of Polyline Vertices. In *Proceedings of the Tenth International Conference on Industry, Engineering and Management Systems*, Cocoa Beach, Fla. March;
(p) Sibson, R. (1973). SLINK: An Optimally Efficient Algorithm for the Single-Link Cluster Method. *Comput. J.* 16(1): 30-34;
(q) Spiegel, M. R. (1975). *Schaum's outline of theory and problems of probability and statistics*. Schaum's outline series. McGraw-Hill, New York, N.Y.;
(r) Voorhees, E. M. (1985a). The effectiveness and efficiency of agglomerative hierarchic clustering in Document Retrieval. Ph.D. Thesis, Cornell University, NY;
(s) Voorhees, E. M. (1985b). The cluster hypothesis revisited. In *Proceedings of the 8th Annual International ACM SIGIR Conference on Research and Development in Information Retrieval*, pp. 188-196; and
(t) Yoon, J. P., V. Raghavan, and V. Chakilam (2001). BitCube: a three-dimensional bitmap indexing for XML documents. *Journal of Intelligent Information Systems*, 17:241-252.

SUMMARY

One embodiment is directed to a method for identifying a cluster of data points, the method including mapping each of the data points into a bitmap, and applying an expansion shape to each of the mapped data points.

Another embodiment is directed to a machine-readable medium containing a computer program for identifying a cluster of data points, the computer program including steps mapping each of the data points into a bitmap, and applying an expansion shape to each of the mapped data points.

Another embodiment is directed to method for identifying a boundary of a cluster in a bitmap, the bitmap having at least one initially set bit, including applying an expansion shape to each of the initially set bits in the bitmap, and identifying vertex bits on the boundary of the cluster formed by at least one expansion shape.

Another embodiment is directed to a method for identifying vertex bits in a bitmap having at least two adjacent bits with set bits forming a boundary of a cluster, the interior bits of the cluster being clear, including starting from a current set bit, evaluating at least a first adjacent bit and a second adjacent bit, setting an adjacent set bit as the new current bit, and identifying the current bit as a vertex bit if a direction of motion from the current bit to the new current bit is different than a current direction of motion.

Another embodiment is directed to a machine-readable medium containing a computer program for defining a boundary of a cluster in a bitmap having at least one initially set bit, the computer program including steps for applying an expansion shape to each of the set bits in the bitmap and identifying vertex bits on the boundary of the cluster formed by at least one expansion shape.

Another embodiment is directed to an apparatus for defining a boundary of a cluster in a bitmap having at least one initially set bit including means for applying an expansion shape to each of the initially set bits in the bitmap, and means for identifying vertex bits on the boundary of the cluster formed by at least one expansion shape.

Another embodiment is directed to a method for identifying vertex bits in a bitmap having at least two adjacent bits with set bits forming a boundary of a cluster, including starting from a current set bit, evaluating at least a first adjacent bit and a second adjacent bit, setting an adjacent set bit as the new current bit, and identifying the current bit as a vertex bit if a direction of motion from the current bit to the new current bit is different than a current direction of motion.

Another embodiment is directed to a machine-readable medium containing a computer program for identifying vertex bits in a bitmap having at least two adjacent set bits forming a boundary of a cluster, the computer program including steps for starting from a current set bit, evaluating at least a first adjacent bit, a second adjacent bit, and a third adjacent bit, setting an adjacent set bit as the new current bit, and identifying the current bit as a vertex bit if a direction of motion from the current bit to the new current bit is different than a current direction of motion.

Another embodiment is directed to a method for identifying vertex bits in a bitmap having at least two adjacent bits with set bits forming a boundary of a cluster, including starting from a current set bit, evaluating at least a first adjacent bit, a second adjacent bit, and a third adjacent bit, setting an adjacent set bit as the new current bit, and identifying the current bit as a vertex bit if a direction of motion from the current bit to the new current bit is different than a current direction of motion.

Further aspects will be apparent based on the following drawings and description.

BRIEF DESCRIPTION OF THE DRAWING FIGURES

Figure 2:
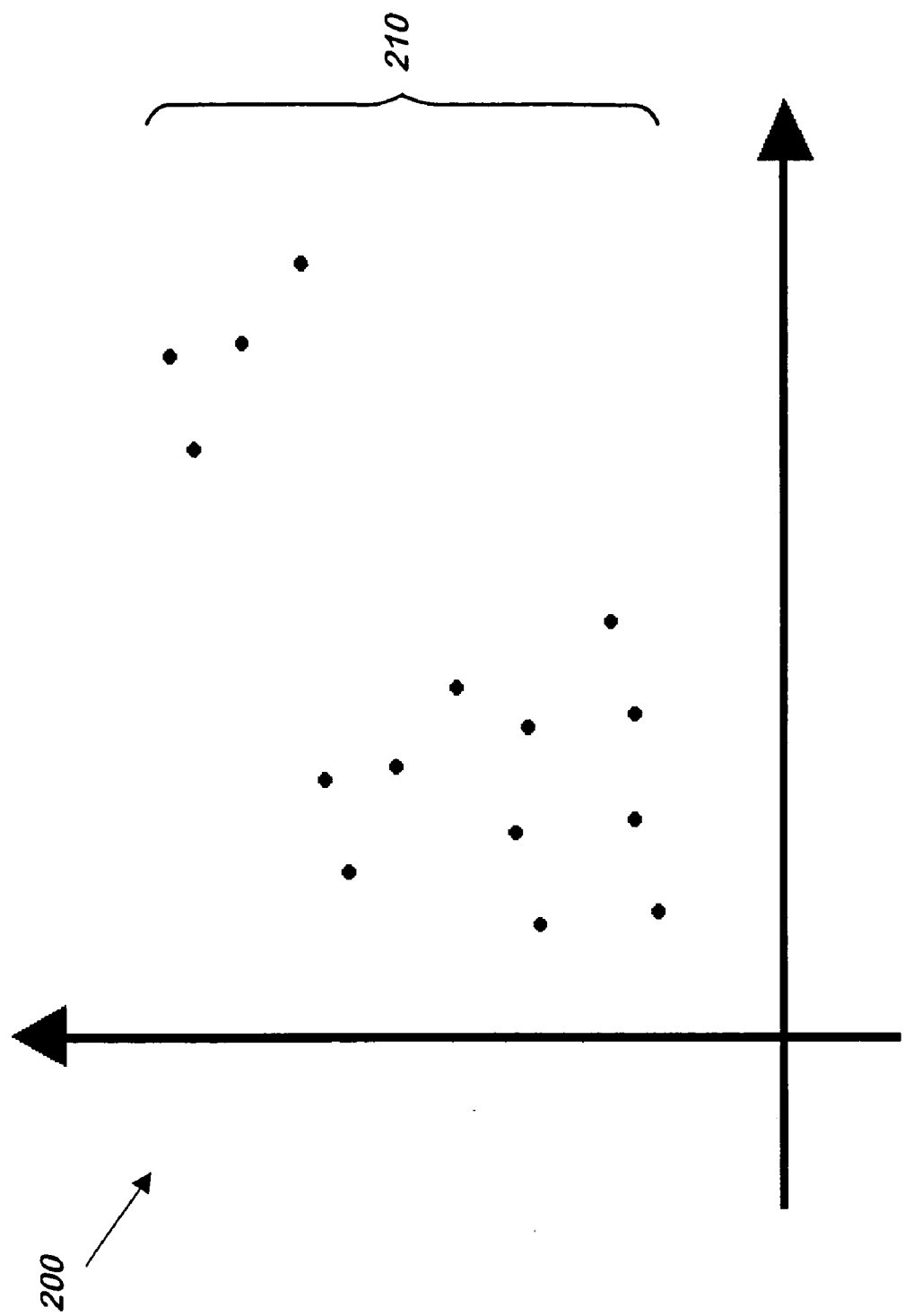
Figure 3:
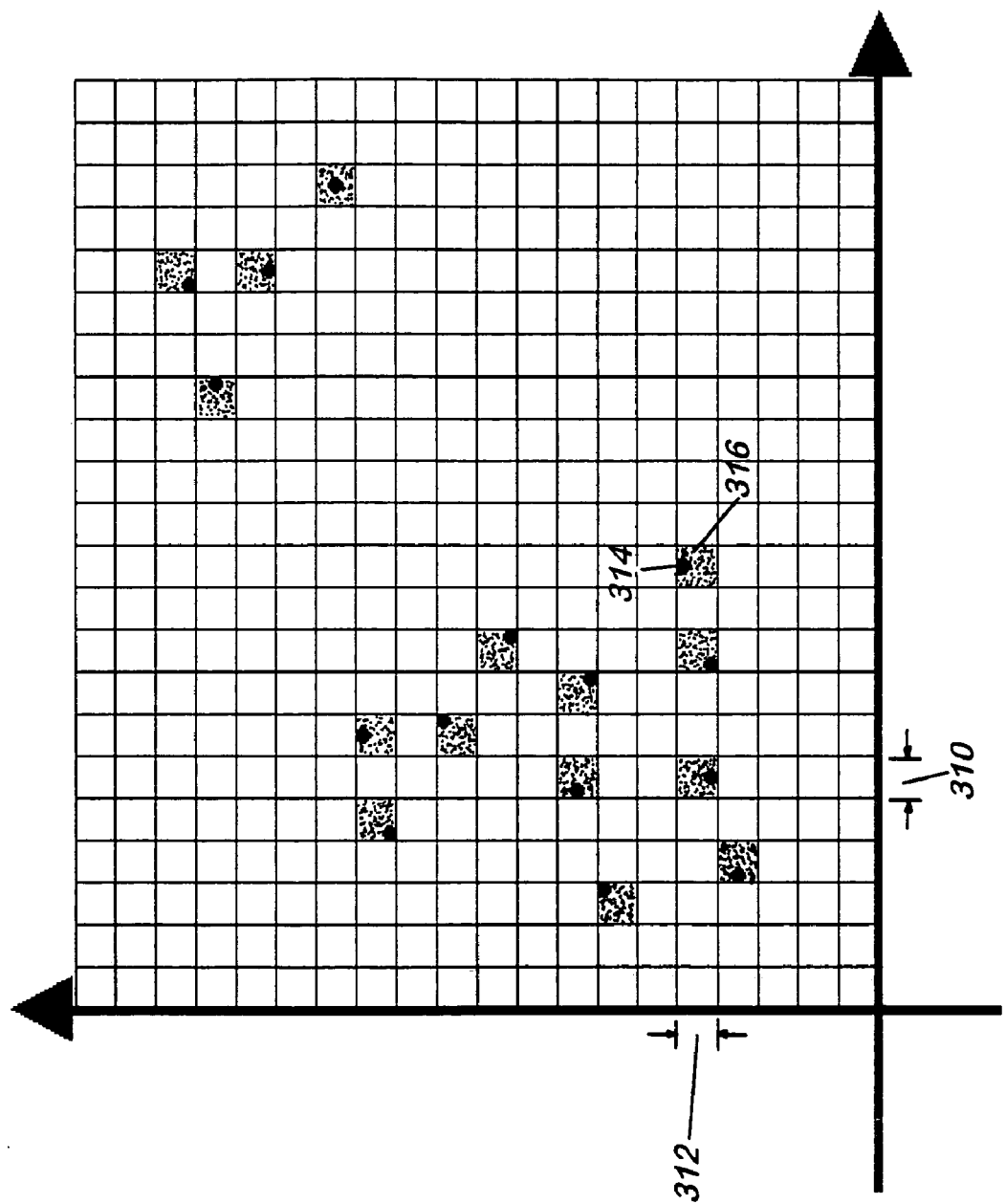
Figure 4:
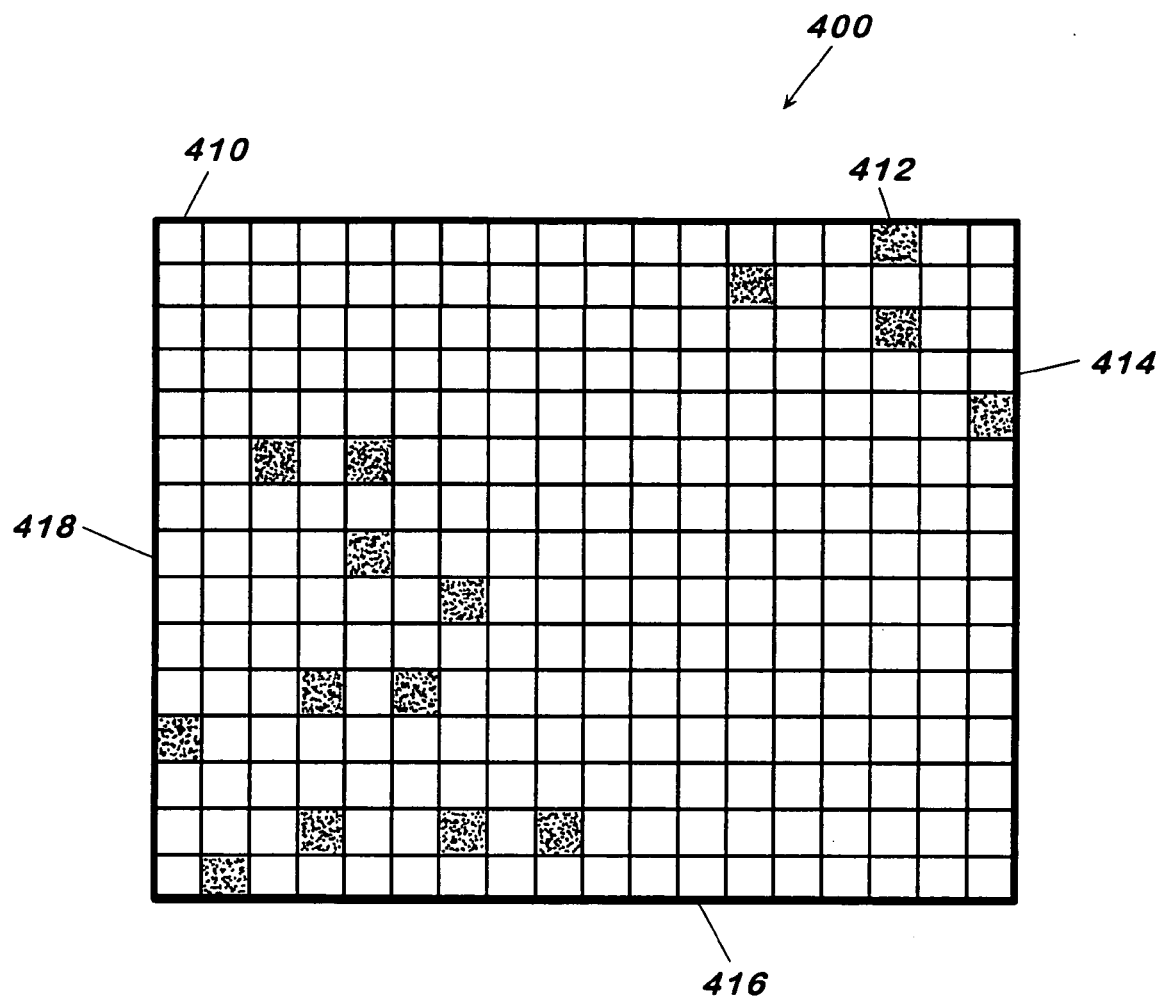
Figure 5:
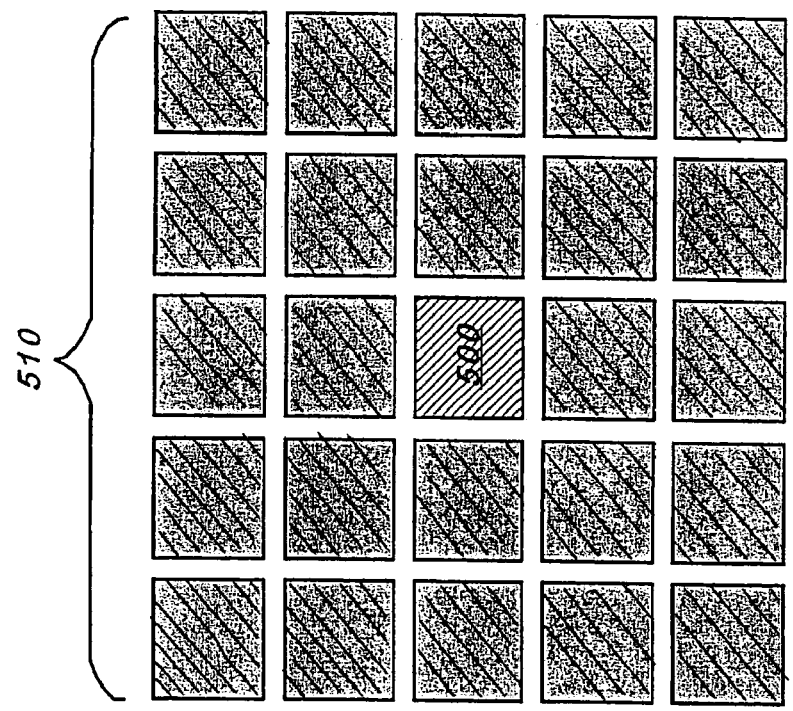
Figure 5:
Figure 5:
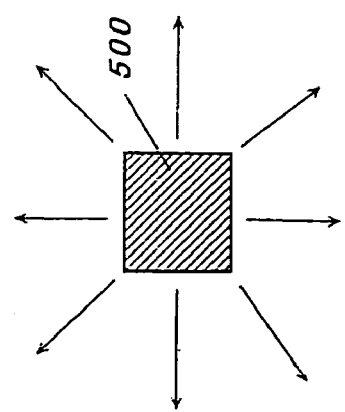
Figure 6:
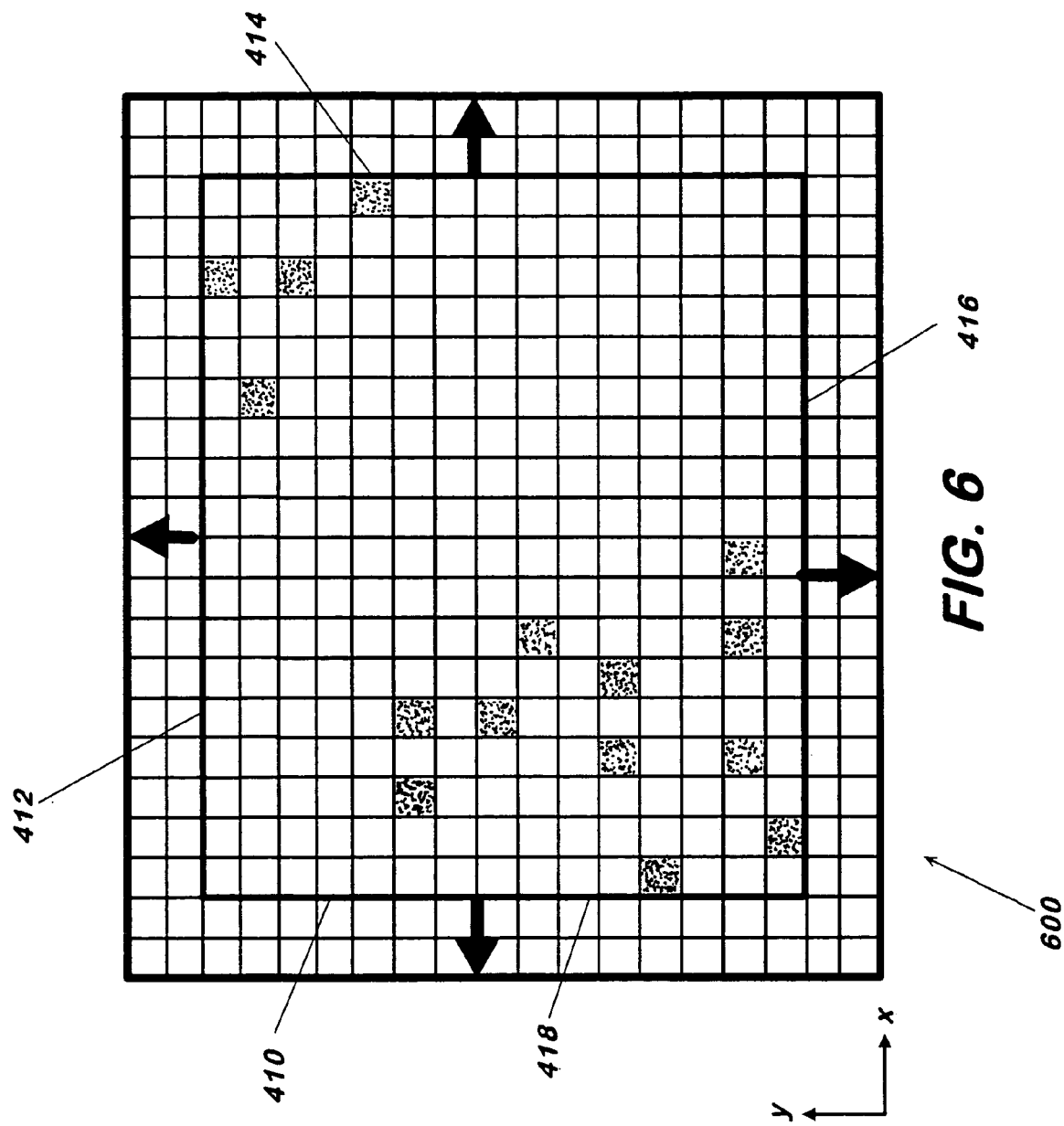
Figure 7:
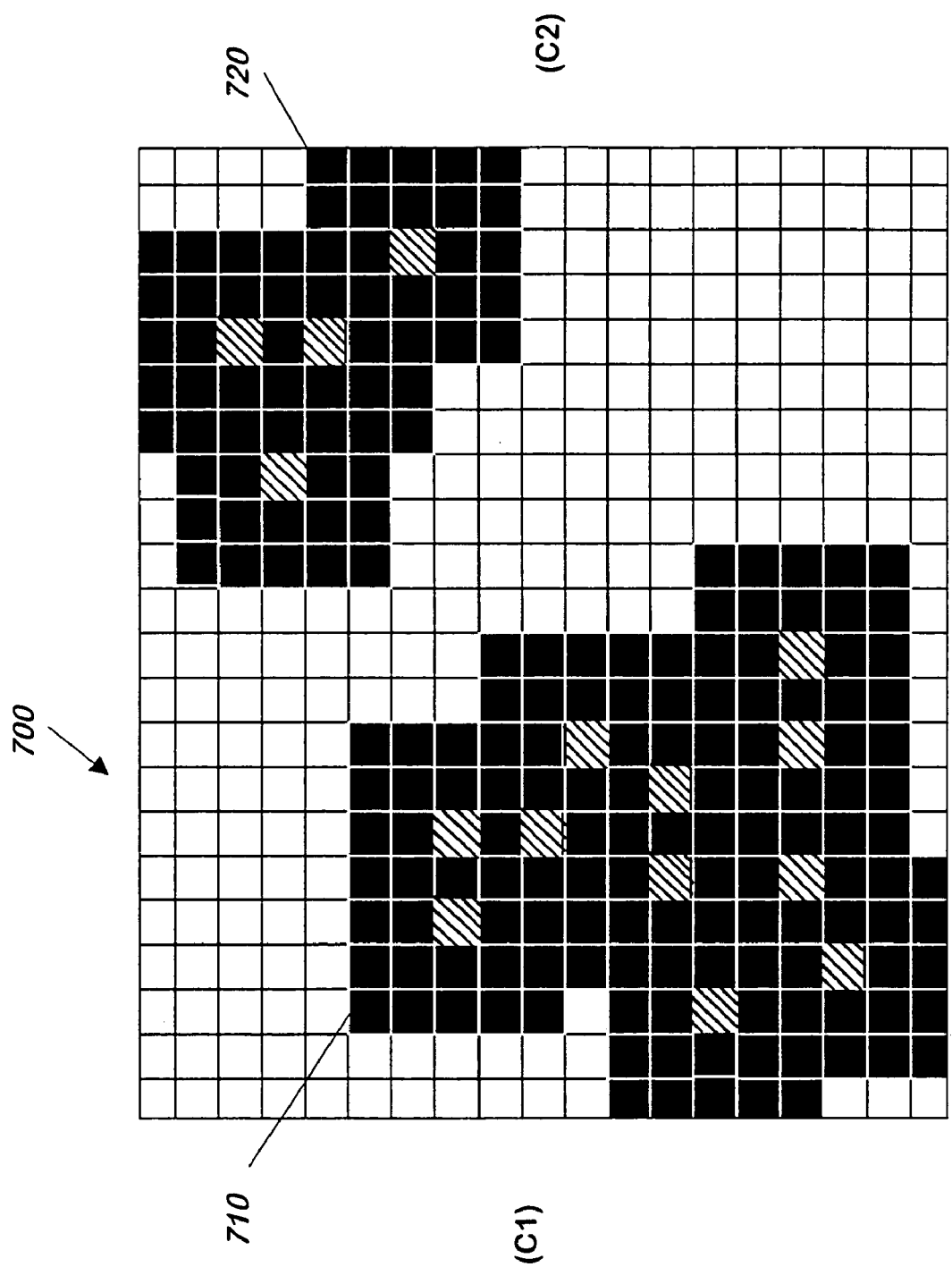
Figure 8A:
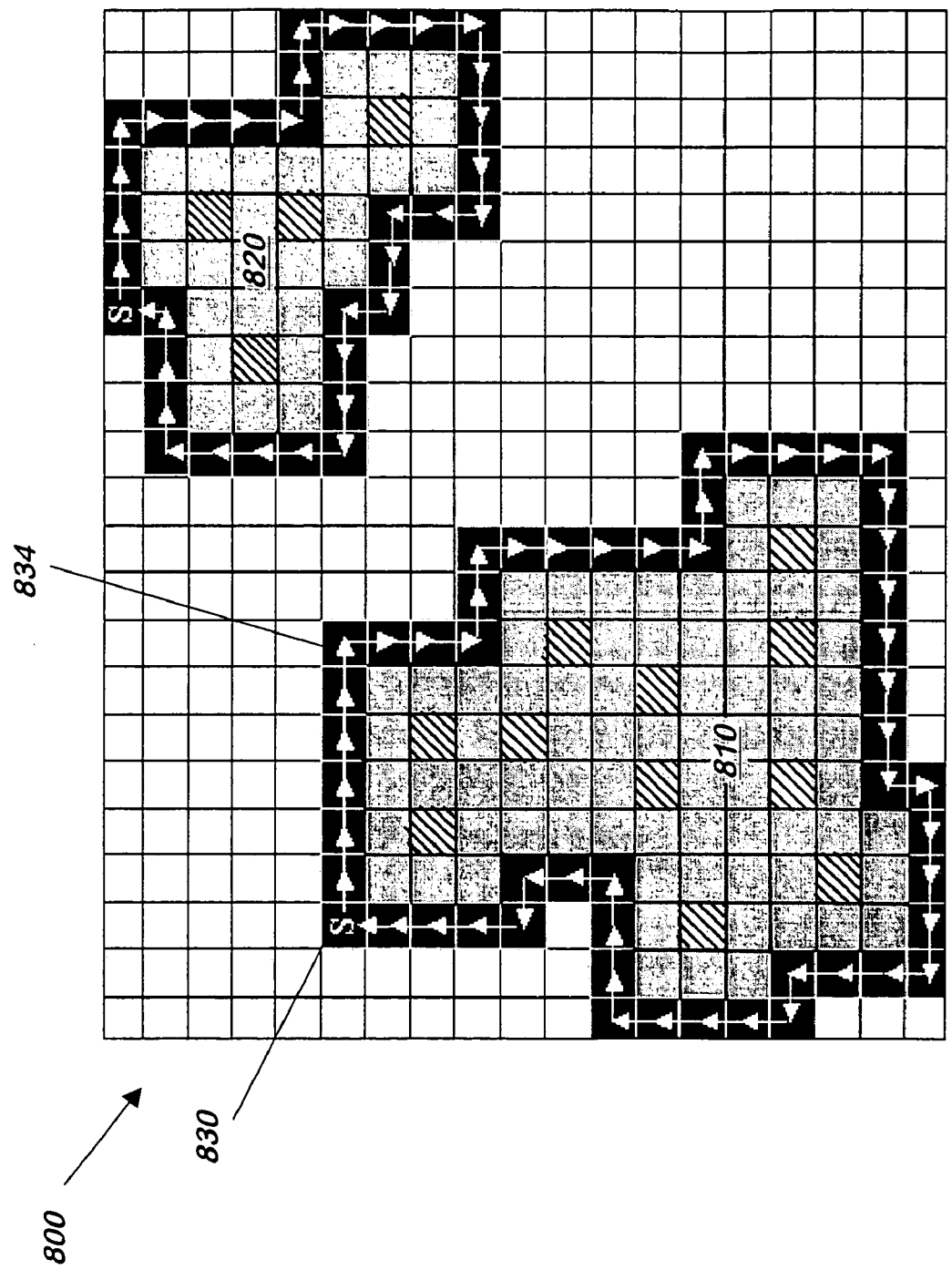
Figure 8B:
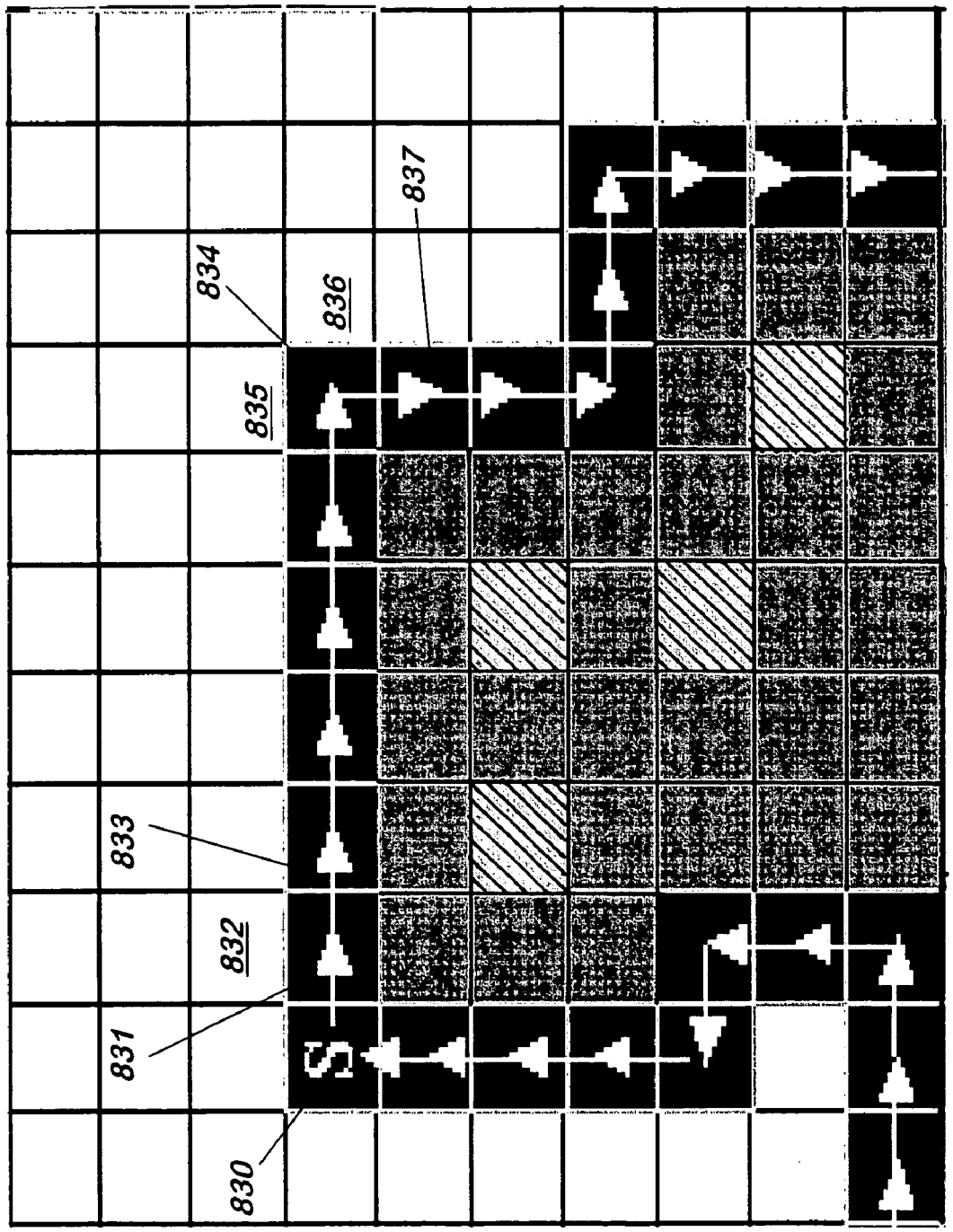
Figure 10A:
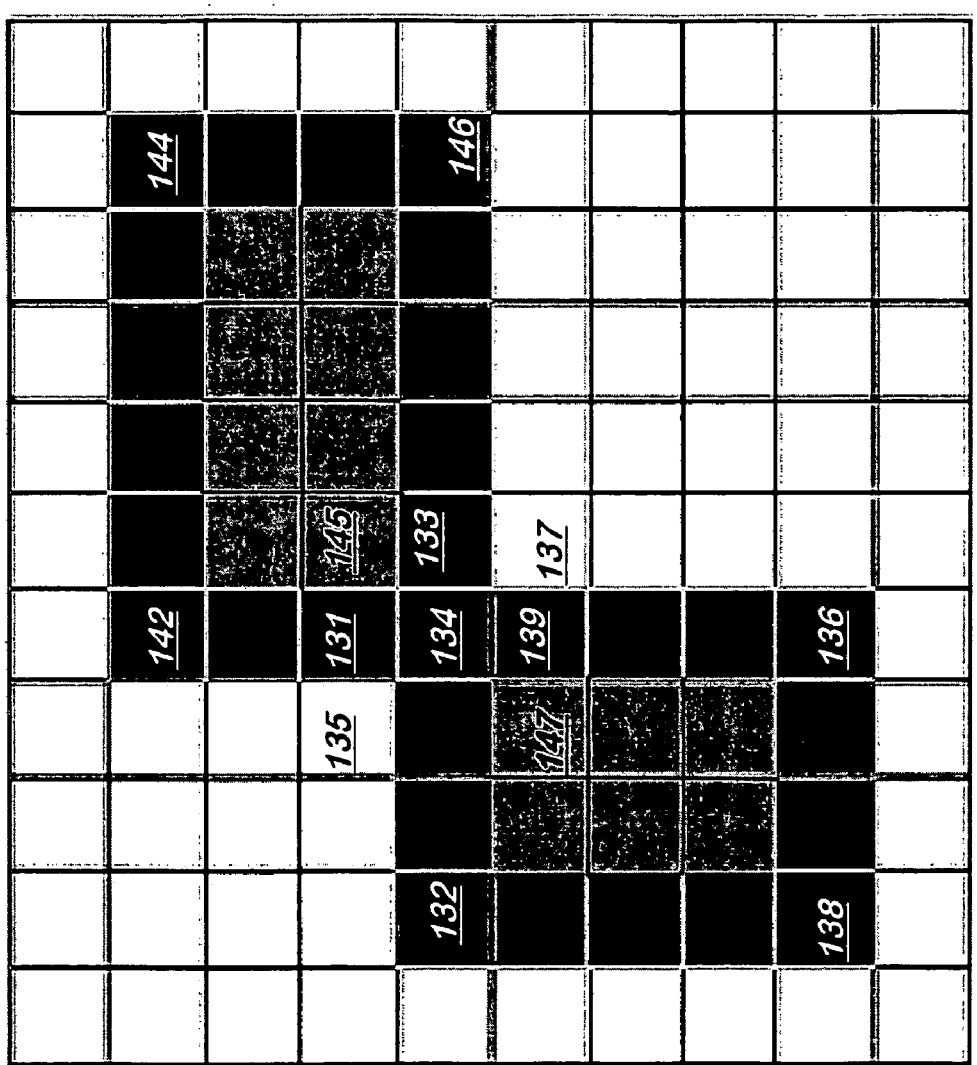
Figure 10B:
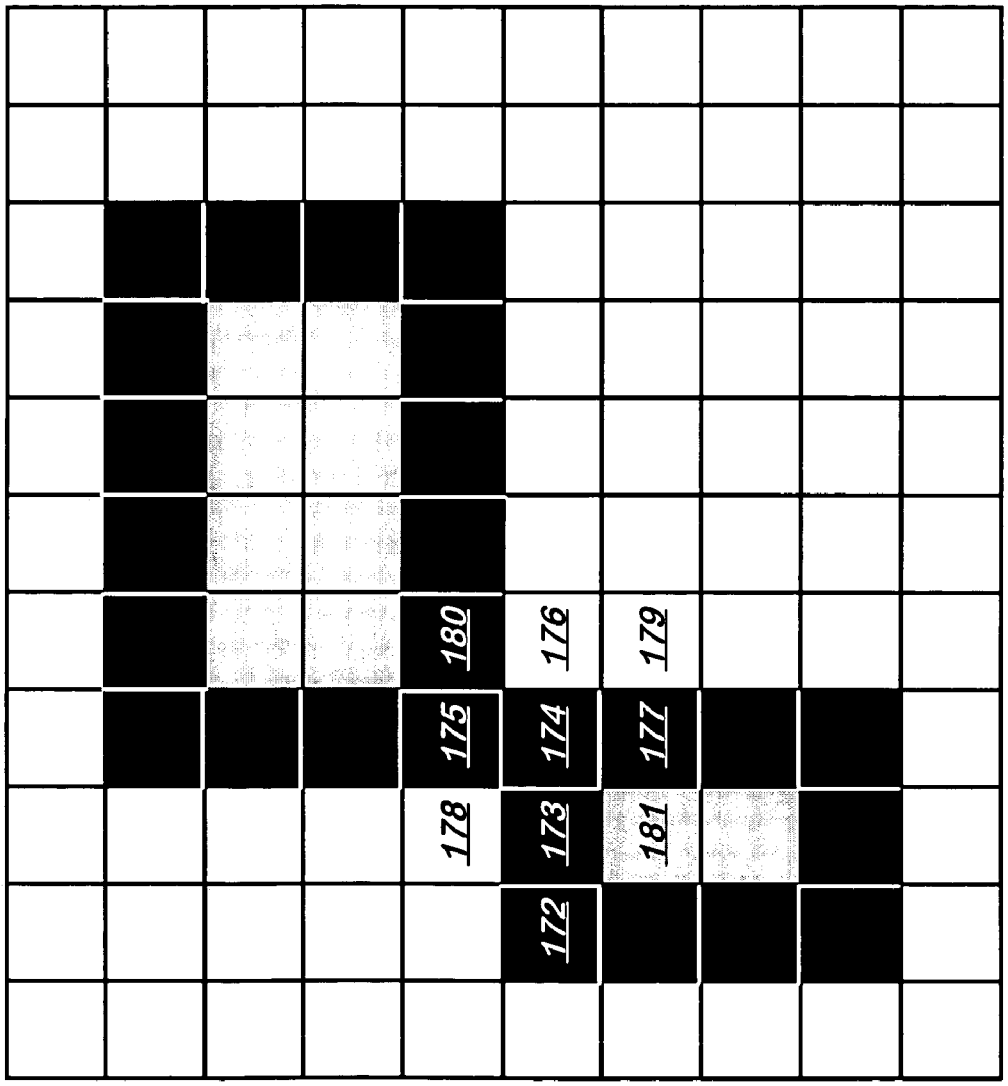
Figure 11:
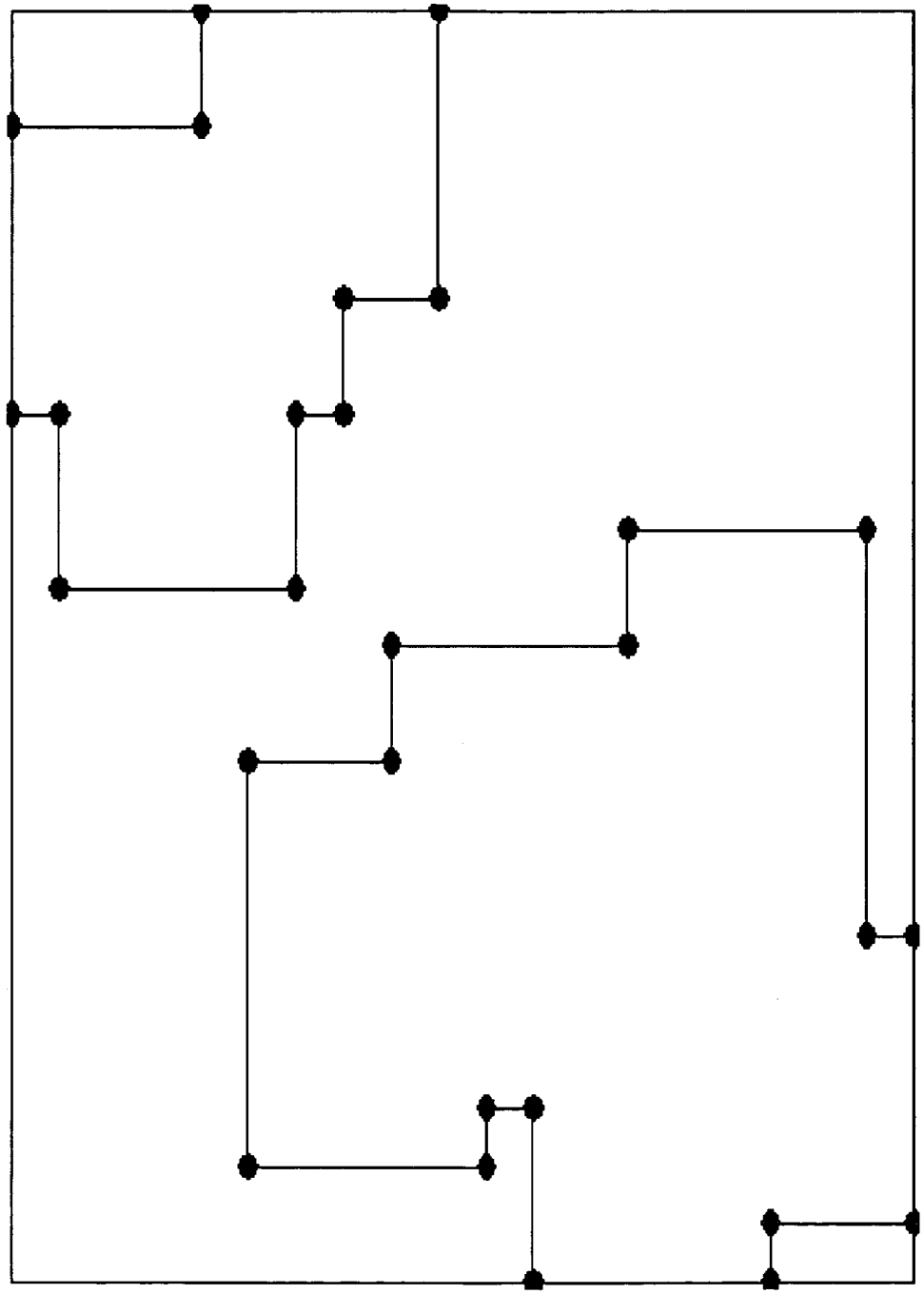

FIG. 1A illustrates a binary two-dimensional bitmap.
FIG. 1B illustrates a dataset for the set bits of FIG. 1A.
FIG. 2 illustrates a graph of points to be clustered.
FIG. 3 illustrates a bitmap mapped to the points of FIG. 2.
FIG. 4 illustrates a minimum bounding rectangle associated with the points of FIG. 2 and FIG. 3.
FIG. 5 illustrates an expansion shape.
FIG. 6 illustrates a bitmap expanded to include expansion shapes.
FIG. 7 illustrates a bitmap expanded to include expansion shapes with internal bits set.
FIG. 8A illustrates traversal of the bitmap to identify vertices.
FIG. 8B illustrates an enlarged portion of FIG. 8A.
FIG. 9A-9D illustrate a method according to an embodiment of the invention.
FIG. 10A-10B illustrate a method according to another embodiment of the invention.
FIG. 11 illustrates a graph identifying cluster vertices.

DETAILED DESCRIPTION OF PREFERRED EMBODIMENTS

The following description describes a technique for clustering objects that can be represented in a bitmap format, and identifying vertex bits that form the boundary of the clusters. Particular examples are described herein in which the bitmap includes "set" or "on" bits having a "1" or "non-zero" value, and "cleared" or "off" bits having a "0" or "zero" value. These terms "on" and "off", "1" and "0", "non-zero" and "zero", and "set" and "cleared" are used for convenience to describe common representations of states that contrast from each other, however, more generally include any two states that can be distinguished from each other. The techniques described herein are also applicable to data having more than two states. For example, this technique is suitable for processing grayscale or color scale data by identifying the pixels with desired grayscale or color values as the "set", "on", "non-zero" or "1" pixels and the pixels with undesired grayscale or color values as the "off", "cleared", or "0" pixels.

The technique described herein can be used to cluster any features, patterns, or points that can be represented in a gridded pattern or bitmap. The cells, bits, or pixels of the grid or bitmap will be referred to in the following examples as "bits", however, it is to be understood that this term encompasses all such cells and pixels.

The patterns or features to be clustered can be quantitative or qualitative. Quantitative feature types include continuous values (e.g., weight), discrete values (e.g., a count), and interval values (e.g., length of time). Qualitative feature types can include nominal (e.g., color) and ordinal (e.g., "big", "medium" and "small"). Continuous values, e.g., latitude, longitude, can be used to cluster features in geographic space. However, the system and method described herein works equally well on features represented by two or more dimensions of other quantitative and qualitative types, such as, but not limited to {latitude, longitude, color} or {color, size, shape}.

A collection of unique elements can be mapped into an appropriate coordinate system. Appropriate two-dimensional (2D) coordinate systems include spherical (r, $\theta$) and Cartesian (x, y), such as the geographic coordinate system (latitude, longitude). Appropriate three-dimensional (3D) coordinate systems include spherical (r, $\theta$, $\phi$) and Cartesian (x, y, z), of which color space (e.g., red, green, blue) is a nominal example. An example of a four-dimensional (4D) coordinate system would be temporal-geospatial (x, y, z, t), in which t represents time.

FIG. 1A illustrates a simple two-dimensional binary bitmap 100 in which bits are turned on (set=1) or off (cleared=0). The index of each bit in the bitmap 100 is unique and denotes its position relative to the other bits in the bitmap. Each bit's location can be indexed by column (x) and row (y). In a three dimensional (3D) bitmap, a bit can be indexed by column (x), row (y) and depth (z). A "set" bit indicates that some object of interest exists at that location, accurate to within the resolution of the bitmap. A cleared bit indicates the absence of any object at that location. For example, the 17 shaded bits are the set bits in the bitmap 100 of FIG. 1A. The dataset 150 of FIG. 1B contains the x and y coordinate values for the set bits of the FIG. 1A bitmap.

A bitmap can represent a n-dimensional space, in which every bit represents an object or feature at some unique location in n-D space. A geospatial bitmap is one that represents a geographical space. U.S. Pat. No. 6,218,965 to Gendron et al., incorporated by reference in its entirety, discloses geospatial bitmaps and methods for generating and manipulating geospatial bitmaps. In a n-dimensional geospatial bitmap, every bit represents an object at some unique location in n-D space. A data structure linking each bit to the geospatial location it represents can be overlaid over the bitmap.

Some examples of geospatially located features that are suitable for clustering include mines on land or in water that have been located with sonar, radar, or other detection or imaging systems. Many other features are also suitable for representation in a geospatial bitmap, as will be apparent to the reader.

Although a geospatial bitmap can be defined for an entire finite space, in some applications, it is preferred that memory is dynamically allocated only when groups of spatially close bits are set. This can produce a compact data structure that supports very fast logical operations (e.g., AND, OR) of multiple bitmaps.

The technique described herein can provide a fast and efficient way to cluster any set of unique data elements in N-dimensional space into bounded polyhedron regions. The vertex points of the polyhedron can be saved to efficiently represent the cluster of data elements. Other information can also be stored for each cluster if desired, including, but not limited to, the density of the cluster (# of features/divided by the area or volume of the polygon or polyhedron). In a two dimensional space, the regions are polygons, bounded by a polyline. The expansion shape can be, for example, a square, a rectangle, a circle, a sphere, an ellipse, an ellipsoid, a cube, a cone, a line segment, a box, or a triangle.

In an exemplary method, the data elements of a set D are represented in a bitmap. For example, the bitmap of FIG. 2 shows the data elements of a set in two dimensional Cartesian space with the X-axis representing longitude and the Y-axis representing latitude, and FIG. 3 shows the corresponding bitmap 300, in which each bit that contains a point has been set (bit value=1), and the remaining bits are clear (bit value=0). The bitmap 300 can be defined such that each bit in the bitmap contains at most one point of the set of points 210. For example, the resolution or size 310 and 312 of the grid elements in the x and y directions can be chosen so that, for example, bit 316 includes only one point or feature 314. Each bit has an index that identifies its unique position. The resulting bitmap 300 has 15 "set bits" corresponding to the 15 points in the graph 200 of FIG. 2.

However, the resolution of the bitmap can also be reduced so that more than one feature is included in each cell. A reason for this might be to reduce the memory required to store the data and/or to increase the processing speed. Another reason might be that the uncertainty of the data makes is likely that features that appear to be close together are actually the same feature at the same physical location.

If desired, the bitmap can be limited in size to the minimum-bounding rectangle (MBR) that will contain the union of sets $U_i$ (Eq. 3). As shown in FIG. 4, the bitmap 400 is bounded by a rectangle 410 just large enough to contain all 15 of the set bits. The minimum-bounding rectangle has sides 412, 414, 416, and 418. An advantage to limiting the size of the bitmap is to minimize the memory requirements.

The features, points, or set bits can each be "expanded" according to an expansion shape by applying an expansion shape to each of the initially set bits, and setting all the bits within the expansion shapes. The expansion shape can be any type of desired shape. For example, points in 2D space can be clustered using a line segment (1D expansion) or using rectangles, ellipses, or triangles (2D expansion). Points in 3D space can be clustered into any 1D, 2D, or 3D (e.g., boxes, spheroids, or cones) shape. Using a circle (2D) or sphere (3D) as an expansion shape provides the benefit of maintaining an equidistant expansion to each set bit. An expansion shape can be selected based on an expected distribution of clustered points. For example, debris from a moving object might be expected to land in an elliptical pattern, so an oval, linear, or elliptical expansion shape could be selected. The expansion shape can be chosen to help preserve or accentuate a perceived pattern in the data. For example, a long, narrow ellipse might be an appropriate expansion shape for clustering a set of points that lie roughly along a line.

In addition, different expansion shapes can be applied within the same bitmap. For example, the size of an expansion shape can be proportional to the distance from the point to a reference point.

FIGS. 5 and 6 illustrates an example of an expansion process for a two dimensional bitmap. The example shown in FIG. 5 uses a 5-bit×5-bit square 510 as the expansion shape to expand the initially set bit 500. Each of the bits within the expansion shape 510 applied to the original set bit 500 is set to a "1" value.

In an embodiment of the invention, the minimum bounding rectangle can be enlarged just enough to accommodate the expansion shape in any direction to ensure the expansion shapes fit within the bitmap. For example, if a 5 by 5 bit square expansion shape is applied to the bits in FIG. 4, the bitmap 400 should be enlarged at least two bits on each side. More generally, the resulting enlarged bitmap 600, has a size equal to the initial minimum-bounding rectangle (MBR) 410 plus the expansion shape minus one bit. So in the y direction, the resulting enlarged bitmap 600 has a dimension of 15+(5−1)=19 bits. Similarly, in the x direction, the enlarged bitmap 600 has a dimension of 18+(5−1)=22 bits. Alternatively, the bitmap bounded by the initial minimum-bounding rectangle can be enlarged by a greater amount, or not enlarged at all. The bitmap can also be enlarged sufficiently to create a buffer of bits around each set point if desired.

In one embodiment of the invention, the size of the bitmap necessary to accommodate the expansion shape associated with each bit is determined before the original points or features are mapped to the bitmap. The following is an example of an algorithm for determining the bitmap size and resolution.

The exemplary algorithm has five initial arguments:

1. A set D of unique data elements to be clustered. The data elements can be points or features in geographical space, or any other suitable data element.

2. A mapping P' used to expand the elements of D. The mapping P' can be the expansion shape discussed in previous paragraphs.

3. The mapping M' that maps the input space S into a continuous Cartesian space GS'. The input space can be of two, three, or more dimensions, can be Cartesian space or any other type of space. The space can include one or more non-geographic dimensions, for example, one dimension might distinguish between red, green, and blue characteristics, or any other types of features for which clustering is useful.

4-5. rx and ry resolutions in specified units, in which the elements of D will be represented in a discrete Cartesian space GB.

The mapping P' is applied to each element $d_i$ of D to produce a set $T_i$ $T_i = \{P'(d_i)\} | d_i \in D$ where $T_i \subset S$ Let $U_i$ be the set created by applying M' to $T_i$: $U_i = \{M'(t)\} \forall t \in T_i$ Let GS be the Minimum Bounding Box (MBB) of the union of the expanded and mapped elements of D: GS=MBB $(U_1 \cup \ldots \cup U_n)$ An empty or "cleared" GB is then created as a discrete approximation of the continuous space GS at resolutions rx and ry.

This algorithm sets the size of a grid so that the grid is large enough to include each feature/corresponding grid element and the expansion shape around each feature/corresponding grid element. This algorithm can suitably be accomplished for points in any type of space.

FIG. 7 illustrates the bitmap 700 that results when the expansion shapes surrounding each point have been set and the bitmap is sized to accommodate the expansion shapes. The bits in the 5×5 square expansion shapes surrounding the initially set bits are shaded to indicate that they have been set to a 1 value. Applying the expansion shapes to the bits allows the points that are geographically close to one another to cluster together.

The size and shape of the expansion shape will have an effect on the resultant cluster resolution (i.e., how close two points must be to be clustered together). A larger expansion shape will result in larger clusters with a greater maximum point spacing, while smaller shapes will result in smaller, tighter clusters. For example, in FIG. 7, two clusters 710 and 720 (C1 and C2) are formed when the expansion shape is 5-bit×5-bit square is used. If a 7-bit×7-bit square expansion shape were applied instead, only one cluster would result.

The resulting cluster or clusters can be represented by a set or graph of 1-bit vertices that define the cluster's bounding polygon. Initially, a copy of the bitmap can be made, and all internal bits of each cluster in the copy are cleared, while the boundary bits in each cluster remain set. This can be accomplished in several different ways. For example, each of the 8 bits surrounding each set bit in a two dimensional bitmap can be evaluated. If all the surrounding eight bits are set, then the bit is an internal bit and can be cleared. For boundary bits, some of the eight surrounding bits will be clear, so the boundary bits remain set. Alternatively, other methods in the field of mathematical morphology can be used to identify the boundary bits.

Once the expansion shapes are applied, the vertex bits can be identified. This can be accomplished in various ways, a few of which are described below.

The vertex bits of each cluster can be defined by traversing the boundary of each cluster, and identifying which bits are vertex bits. Traversal of the cluster preferably starts at a convex vertex, for which the interior angle is less than 180 degrees, and for which there is knowledge of the vertex's relationship to the polygon. However, the starting point can be any of the set bits on the boundary of a cluster.

In one embodiment of a method for identifying vertex bits, the internal bits of the clusters can be cleared or remain set. Traversal of the clusters proceeds along the boundary bits. At each boundary bit, the algorithm identifies which of the three adjacent bits in the three possible directions (90 degrees counterclockwise, straight forward along the current direction of motion, or 90 degrees clockwise) are set. If the counterclockwise bit is set, the algorithm chooses the counterclockwise set bit as the next current bit. If the counterclockwise bit is not set, the algorithm evaluates the bit in the forward position, and if it is set, chooses it as the next current bit. If neither of the counterclockwise or the straight forward bits are set, the clockwise bit is checked, and if it is set, it is chosen as the next current bit. A stop point is reached if none of these three bits are set or if the original starting bit is reached. When the direction of motion changes, the current bit is identified as a vertex bit. In this embodiment, the algorithm traverses the cluster in a counterclockwise direction. A clockwise traversal is also suitable.

An example is shown in FIGS. 8A and 8B. In this embodiment, the algorithm traverses the boundary bits and evaluates at least one bit of the surrounding 8-bit neighborhood. The traversal method can be the counterclockwise or clockwise process described above, or another process. For example, if the traversal starts at an upper-left vertex of the cluster, the edge leaving that vertex in a clockwise direction is to the right. From this vertex, traversal continues clockwise around the cluster: at each bit along the boundary, the algorithm tests whether the next set bit is in one of three directions from the current bit, in order: 1) 90° counter-clockwise from the current bit, or 2) in the same direction as the previous iteration, or 3) 90° clockwise from the current bit. An allowable direction is based on whether the new bit is set, and whether that bit is not part of a different polygon. FIG. 8A illustrates a clockwise traversal of clusters 810 and 820 (C1 and C2), and FIG. 8B shows a portion of the traversal of cluster 810. In this embodiment, the clusters are traversed one at a time.

1. Start at the upper-left-most bit 830 in the cluster, which is the first vertex in the traversal. Move one bit to the right (clockwise direction) to bit 831. If it is known that the starting point is an upper left vertex, it is known that the adjacent bit to the right is set, so a suitable first movement is one bit to the right.
2. Test whether the bit 832 immediately above (90° counterclockwise) bit 831 is set: no.
3. Test whether the bit 833 immediately to the right (continuing in the same direction as before) of bit 831 is set: yes. Bit 833 becomes the current bit.
4. Repeat steps 2-3, moving one bit at a time along the top edge of the cluster, until the next vertex (bit 834) is reached. At that point, the tests in steps 2 and 3 will fail (e.g., bits 835 and 836 are not set), and the algorithm will try the third directional test: whether the bit 843 immediately below (90° clockwise) bit 840 is set, which it is. Bit 837 becomes the current bit. When the direction of traversal changes, as in this case, the bit 834 is tagged as a vertex and the process continues.
5. Traversal is complete when it returns to the original vertex bit 830 in the cluster 810 (C1), here the upper-left-most vertex in the cluster.

In some cases, a vertex bit can belong to more than one cluster. The steps 1-5 above identify the vertex bits, however, do not check for set bits that are diagonally adjacent from each other.

Figure 9A:
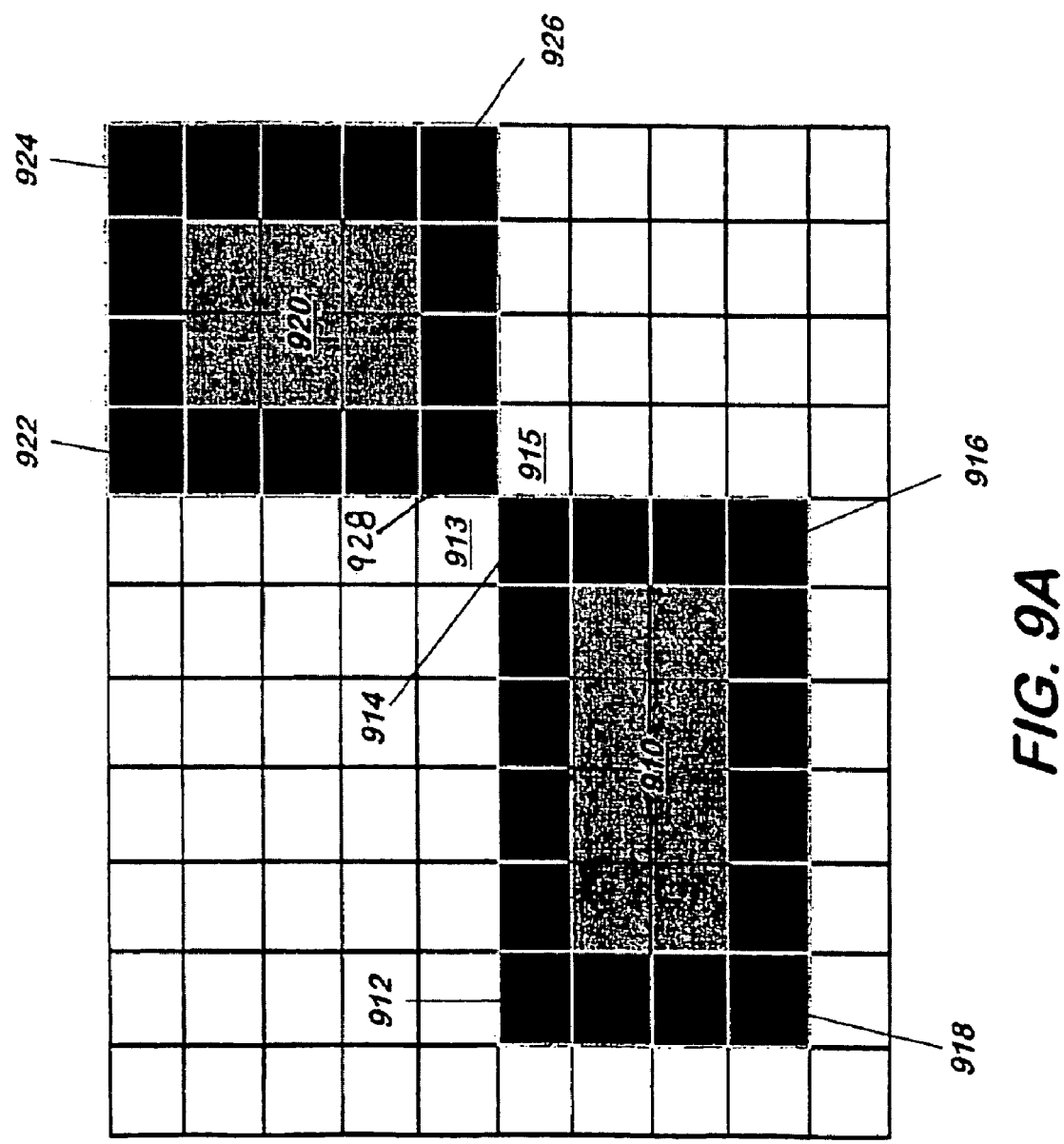

Another example is illustrated in FIG. 9A. In this figure, application of steps 1-5 above will result in clusters 910 and 920 being stored as two separate clusters, with vertex bits 912, 914, 916, and 918 and vertex bits 922, 924, 926, and 928, respectively. When 914 is the current bit and traversal is in the clockwise direction, the steps 2 and 3 above would check whether bits 913 and 915 are set, without checking whether diagonally adjacent bit 928 is set. Similarly, when bit 928 is the current bit and traversal of cluster 920 is in the clockwise direction, steps 2 and 3 above would check whether bits 915 and 913 are set, without checking whether diagonally adjacent bit 914 is set. Traversal would proceed until the starting bit 912 is reached. However, when clusters share a bit or have side-by-side adjacent bits, it is helpful to include additional steps for traversing the boundary bits.

Figure 9B:
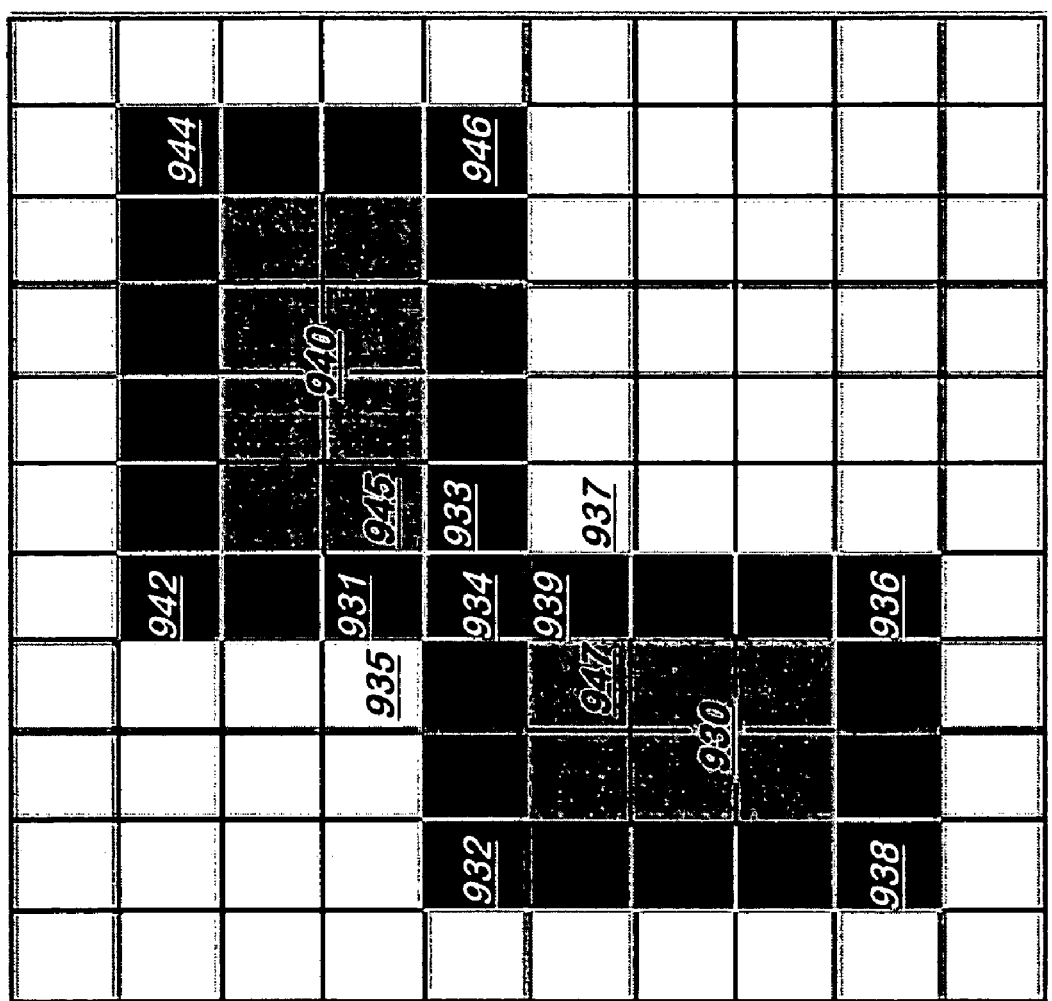
Figure 9C:
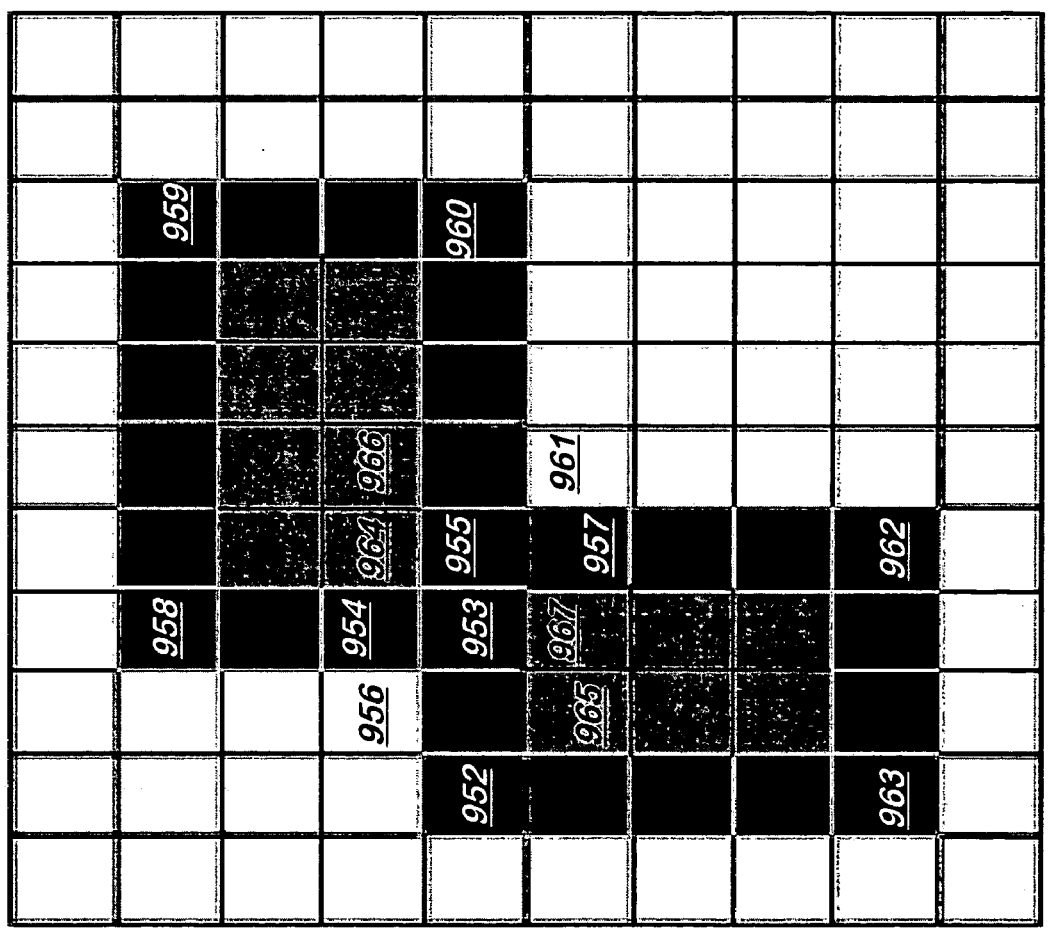

Steps for determining whether two clusters sharing one or more bits comprise one cluster or two clusters are illustrated in FIG. 9B-9C. In these figures, the interior vertex bits have not been cleared, so both the boundary bits and the interior bits are set.

In FIG. 9B, one vertex bit 934 is shared by two clusters 930 and 940. In FIG. 9C, the clusters overlap by more than one bit, and are considered one cluster 960. The algorithm determines whether there are two adjacent clusters or one continuous cluster by examining the 8-bit neighborhood around the bit in question. This test only occurs if more than one potential direction could be taken from the current bit (i.e., if the bits that are 90° counter-clockwise and straight ahead from the current bit are both set, as in FIGS. 9B and 9C). If there are two cleared bits diagonally opposite each other (and flanking the current bit) within the 8-bit neighborhood around a current bit, then the last possible direction is taken. For example, in FIG. 9B, during traversal of the boundary from bit 932 to 934, when bit 934 is the current bit, the algorithm checks to see whether the bit 931 that is 90 degrees counterclockwise from the current bit, the bit 933 that is straight ahead, and the bit 939 that is 90 degrees clockwise are set. At least two of the bits 931, 933, and 939 are set, so diagonally opposite pairs 935, 937 and 945, 947 are checked. Since the bit pair 935, 937 is clear, the last possible direction is taken (90° clockwise in FIG. 9B), and bit 939 becomes the current bit. Traversal continues to vertex bits 936, 938, and ends at the starting vertex bit 932.

If there are not two cleared bits diagonally opposite each other (and flanking the current bit), then the first possible direction is taken. For example, in FIG. 9C, after traversal from bit 952 to bit 953, the current bit 953 has two possible directions of motion to an adjacent set bit (90° counter-clockwise toward bit 954 or straight forward along the direction of previous motion toward bit 955). By checking bit pairs 956, 957 and 954, 965, it is seen that there is not a pair of clear, diagonally-opposite bits in the 8-bit neighborhood surrounding current bit 953, so the first possible direction is chosen (90 degrees counterclockwise), and bit 954 is assigned as the new current bit. Traversal continues through vertex bits 958, 959, and 960, and from bit 960 to bit 955. At this point, there are again two possible directions (90 degrees counterclockwise toward bit 957 or straightforward toward bit 953). The diagonal bit pairs 954, 961 and 966, 967 are checked. Since neither bit pair is clear, the first possible direction is selected, and the 90 degree counterclockwise bit 957 becomes the new current bit. Traversal continues through vertex bits 962 and 963, and is completed when the starting vertex bit 952 is reached.

In FIG. 9D, traversal begins at vertex bit 972, and continues toward bits 973 and 974. When bit 974 is the current bit, there are two possible directions of motion to another set bit (toward adjacent set bit 975 or toward adjacent set bit 977). The surrounding 8-bit neighborhood is checked to see whether there is at least one pair of diagonally adjacent clear bits. Since diagonally opposite bits 978 and 979 are both clear, the last option is selected, and bit 977 becomes the new current bit. Traversal continues to vertex bits 982 and 983, until starting vertex bit 972 is reached.

Thus, the bitmaps in FIGS. 9A and 9D each have two clusters with four vertices each, the bitmap in FIG. 9B has two clusters with four vertices each, one of which is shared, and the bitmap in FIG. 9C includes one cluster with 8 vertices.

Thus, FIG. 9A includes two clusters with four vertices each, FIG. 9B illustrates two clusters with four vertices each, one of which is shared, and FIG. 9C illustrates one cluster with 8 vertices.

Other methods for identifying vertex bits include making a copy of the bitmap, and clearing the interior bits in the copy so only the boundary bits remain set, then using one of the following methods for traversing the boundary bits to identify the vertices of the clusters.

In one method, when there is more than one possible direction of motion (e.g., more than one of the three adjacent bits in the 90 degrees counterclockwise, forward, and 90 degrees clockwise directions is set), the algorithm always selects the last direction, and traversal continues around the clusters until the starting bit is reached.

In another method, at least one diagonal bit pair is checked there are at least two possible directions of motion from a current bit. FIG. 10A-FIG. 10B illustrate some aspects of this method. If more than one potential direction could be taken from the current bit, the algorithm checks to see if a particular diagonally opposite bit pair is clear. The bit pair to be checked includes the bit that is diagonally adjacent to the current bit, and is between the first possible direction of motion (e.g., 90 degrees counterclockwise) and the bit in the second possible direction of motion (e.g., forward along the current direction of motion). For example, in FIG. 10A, when the current bit is 934, and there are three adjacent set bits 131, 133, and 139 in each of the three possible directions (90 degrees counterclockwise, in the current direction of motion, and 90 degrees clockwise), the bit pair to be checked includes bit 145 (between bits 131 and 137) and its opposite diagonal bit 147. Since the diagonally opposite bits 145 and 147 are both clear, the first option (90 degrees counterclockwise) is selected, and the new current bit will be bit 131. Since the direction of motion has changed, current bit 134 is tagged as a vertex bit.

If at least one of the diagonal opposite bit pair 145 and 147 were not clear, the last possible direction would be taken. For example, in FIG. 10B, bit 174 is the current bit, and the direction of motion is from bit 173 to 174. At least two of the three adjacent bits are set (bits 174 and 181 are set), so the bit pair 180 and 181 is checked. Since bit 180 is set, the last option is taken, and the bit 177 becomes the new current bit, and the current bit 174 is tagged as a vertex bit. Traversal of this cluster continues until the starting point bit 172 is reached.

Other methods of traversing the boundary of the cluster will also be apparent based on the foregoing examples.

After the clusters have been traversed, the cluster's bitmap is reduced to a vector boundary, and a graph of all vertices defining the cluster's bounding polygon is created. FIG. 11 represents a graph of all vertices defining the cluster's bounding polygon for clusters 810 and 820 of FIG. 8A.

The number and locations of all the originally set points inside each cluster can be determined by performing a logical AND on each cluster GB with GB1 (the cluster that contained the original points). For example, GB2=GB AND GB1. The resulting GB2 is then traversed to obtain the number of set bits and their unique locations.

Once the vertex bits have been identified, it is possible to calculate the density of each cluster as the number of set bits divided by the total number of bits in the cluster, or any other suitable measure. The cluster density can be used in subsequent polyline smoothing steps, to discard clusters with low density, to limit presentation of only clusters with sufficient density to be of interest, or for other purposes.

The method described herein can also be used repetitively to create a hierarchical cluster structure, but are preferably implemented as a single-pass, non-hierarchical clustering method.

The methods described herein have advantages over known hierarchical agglomerative clustering methods. The method is faster than previous hierarchical agglomerative clustering methods. Further, the method does not tend to produce long chains or ellipsoidal clusters, in contrast to known single-link algorithms. Further, the method does not tend to form clusters in which most vectors exhibit a high degree of membership to one cluster, in contrast to known hierarchical "fuzzy clustering" methods.

The method described herein also has several advantages compared to the single-pass, nearest neighbor, and relocation non-hierarchical clustering methods. In particular, the results of the clustering algorithm described are independent of the order of the input data. Because there is no need to calculate and compare the distances between every pair of elements in the dataset to determine which elements should be clustered together, the method described herein for clustering elements can be about an order of magnitude faster, less computationally intensive, and requires much less computer memory than the Nearest Neighbor algorithms. The method described herein also has advantages over other single pass algorithms.

In addition, unlike some Relocation methods, the method described herein does not require seed elements to initiate the clustering process. Other advantages will be apparent to the reader based upon the description herein.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, XML, C++ objects, Java and Microsoft Foundation Classes (MFC).

Although this invention has been described in relation to the exemplary embodiment's thereof, it is well understood by those skilled in the art that other variations and modifications can be affected on the preferred embodiment without departing from scope and spirit of the invention as set forth in the claims.

The invention claimed is:

1. A computer-implemented method for identifying a boundary of a cluster in a bitmap, the bitmap having at least one initially set bit, the method comprising: applying an expansion shape to each of the initially set bits in the bitmap on a computer; identifying vertex bits on the boundary of the cluster, the cluster including at least one expansion shape on the computer; for a current boundary bit with a first, second, and a third adjacent bit, evaluating at least two diagonally opposite adjacent bits if at least two of the first, the second, and the third adjacent bits are set on the computer; wherein one of the diagonally opposite adjacent bits is between the first and second adjacent bits; and assigning the adjacent set bit that was evaluated first as the new current bit on the computer if both of the two diagonally adjacent bits are clear.

2. The method according to claim 1, wherein said applying an expansion shape includes setting each of the bits within the expansion shape.

3. The method according to claim 1, wherein the cluster includes at least two expansion shapes, the two expansion shapes having at least one bit in common.

4. The method according to claim 1, wherein the cluster includes at least two expansion shapes, the two expansion shapes having at least two bits in common.

5. The method according to claim 1, wherein each of the bits in the bitmap corresponds to a geospatial location.

6. The method according to claim 1, wherein each initially set bit in the bitmap corresponds to a feature at a physical location.

7. The method according to claim 6, wherein each initially set bit in the bitmap corresponds to only one feature.

8. The method according to claim 1, wherein the expansion shape is a polyhedron.

9. The method according to claim 1, wherein the boundary is a polyhedron.

10. The method according to claim 1, further comprising: expanding the bitmap to a size sufficient to include all the initially set bits.

11. The method according to claim 1, further comprising: limiting the bitmap to a size sufficient to include all the initially set bits and all the bits in the expansion shapes.

12. A method according to claim 1, wherein the cluster is a cluster of set bits in the bitmap, and at least two of the expansion shapes around each of the initially set bits combine to form the cluster of set bits.

13. A method according to claim 12, wherein said applying an expansion shape includes setting at least one bit adjacent to each of the initially set bits.

14. The method according to claim 12, wherein said applying an expansion shape to each initially set bit includes setting a plurality of bits adjacent to each initially set bit.

15. The method according to claim 13, wherein said applying an expansion shape to each initially set bit includes setting a plurality of bits around each initially set bit.

16. The method according to claim 13, wherein the bitmap comprises binary bits having states including set and off.

17. The method according to claim 13, wherein said identifying vertex bits on the boundary of the cluster of said bits is accomplished after applying the expansion shapes to each of the initially set bits.

18. The method according to claim 15, wherein the expansion shape is a circle.

19. The method according to claim 15, wherein the expansion shape is a triangle.

20. The method according to claim 15, wherein the expansion shape is an ellipse.

21. The method according to claim 15, wherein the expansion shape has a size proportional to a distance between a reference point and a point corresponding to the initially set bit.

22. A computer-implemented method for identifying a boundary of a cluster in a bitmap, the bitmap having at least one initially set bit, the method comprising: applying an expansion shape to each of the initially set bits in the bitmap on a computer; identifying vertex bits on the boundary of the cluster on the computer, the cluster including at least one expansion shape; evaluating at least two diagonally opposite adjacent bits if at least two of the first, second, and third adjacent bits are set on the computer; wherein one of the diagonally opposite adjacent bits is between the first and second adjacent bits; and assigning the adjacent set bit that was evaluated last as the new current bit on a computer if at least one of the two diagonally adjacent bits are not clear.

23. A computer-readable medium containing computer-readable instructions for defining a boundary of a cluster in a bitmap having at least one initially set bit, the computer readable instructions comprising: instructions for applying an expansion shape to each of the set bits in the bitmap; and instructions for identifying vertex bits on the boundary of the cluster formed by at least one expansion shape, instructions for evaluating at least two diagonally opposite adjacent bits if at least two of a first, a second, and a third adjacent bit are set; wherein one of the diagonally opposite adjacent bits is between the first and second adjacent bits; and instructions for assigning the adjacent set bit that was evaluated first as the new current bit if both of the two diagonally adjacent bits are clear.

24. The computer readable medium according to claim 23, wherein said instructions for applying an expansion shape includes instructions for setting each of the bits within the expansion shape.

25. The computer readable medium according to claim 23, wherein the cluster includes at least two expansion shapes, the two expansion shapes having at least one bit in common.

26. The computer readable medium according to claim 23, wherein the cluster includes at least two expansion shapes, the two expansion shapes having at least two bits in common.

27. The computer readable medium according to claim 23, wherein each of the bits in the bitmap corresponds to a geospatial location.

28. The computer readable medium according to claim 23, wherein each initially set bit in the bitmap corresponds to a feature at a physical location.

29. The computer readable medium according to claim 23, wherein each initially set bit in the bitmap corresponds to only one feature.

30. The computer readable medium according to claim 23, wherein the expansion shape is a polyhedron.

31. The computer readable medium according to claim 23, wherein the boundary is a polyhedron.

32. The computer readable medium according to claim 23, further comprising: instructions for expanding the bitmap to a size sufficient to include all the initially set bits.

33. The computer readable medium according to claim 23, further comprising: instructions for limiting the bitmap to a size sufficient to include all the initially set bits and all the bits in the expansion shapes.

34. The computer readable medium according to claim 23, wherein said instructions for identifying said vertex bits on the boundary of a cluster includes instructions for identifying the current bit as a vertex if a direction from the current bit to the new current bit is different than a current direction of motion, wherein the current direction of motion is a direction is a direction from an immediately previous bit to the current bit.

35. The computer readable medium according to claim 23, wherein the cluster is a cluster of set bits in the bitmap, and at least two of the expansion shapes around each of the initially set bits combine to form the cluster of set bits.

36. The computer readable medium according to claim 35, wherein said applying an expansion shape to each initially set bit includes setting a plurality of bits adjacent to each initially set bit.

37. The computer-readable medium according to claim 35, wherein said applying an expansion shape to each initially set bit includes setting a plurality of bits around each initially set bit.

38. The computer-readable medium according to claim 35, wherein the bitmap comprises binary bits having states including set and off.

39. The computer-readable medium according to claim 35, wherein said identifying vertex bits on the boundary of the cluster of said bits is accomplished after applying the expansion shapes to each of the initially set bits.

40. The computer-readable medium according to claim 37, wherein the expansion shape is a circle.

41. The computer-readable medium according to claim 37, wherein the expansion shape is a triangle.

42. The computer-readable medium according to claim 37, wherein the expansion shape is an ellipse.

43. The computer-readable medium according to claim 37, wherein the expansion shape has a size proportional to a distance between a reference point and a point corresponding to the initially set bit.

* * * * *